Oct. 27, 1925.

H. A. KJELSBERG 1,558,893

ELECTRIC RACK LOCOMOTIVE DRIVE MECHANISM

Filed Oct. 6, 1922

WITNESSES:
R. J. Butler
M. B. Jaspert

INVENTOR
Harald A. Kjelsberg.
BY
Wesley G. Carr
ATTORNEY

Patented Oct. 27, 1925.

1,558,893

UNITED STATES PATENT OFFICE.

HARALD A. KJELSBERG, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC RACK-LOCOMOTIVE DRIVE MECHANISM.

Application filed October 6, 1922. Serial No. 592,781.

*To all whom it may concern:*

Be it known that I, HARALD A. KJELSBERG, a citizen of Switzerland, and a resident of Wilkinsburg, in the county of Allegheny and State of Pennsylvania, have invented a new and useful Improvement in Electric Rack-Locomotive Drive Mechanism, of which the following is a specification.

My invention relates to rack-locomotive driving mechanism, more specifically to the rack-gear mounting thereof.

It is among the objects of this invention to provide a rack-gear mounting for rack locomotives which shall be of simple and efficient construction, which shall be conducive to minimize operating costs and which shall eliminate the relatively frequent renewal of the operating parts.

In rack locomotives, in which the traction is effected by means of a driving gear in engagement with a rack, considerable difficulty is encountered in the wearing of the wheel tires which results in the alteration of the pitch line or meshing of the gear wheel with the rack. This requires frequent renewals of the wheel rims which is expensive and interferes with the operation of the system.

My present invention is directed primarily to a means for overcoming these difficulties by providing adjustment between the rack gear and rack to take up the amount of wear produced on the tires, thereby permitting of longer use of the wheels and less interrupted service.

Figure 1:
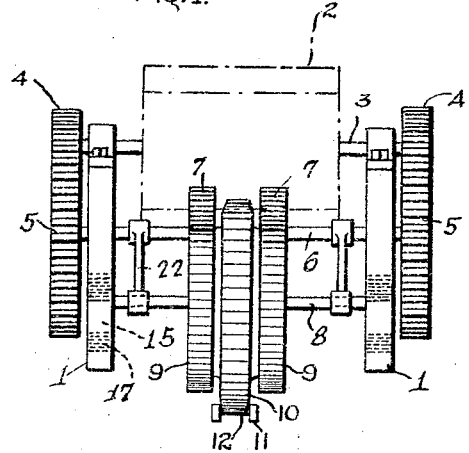
Figure 2:
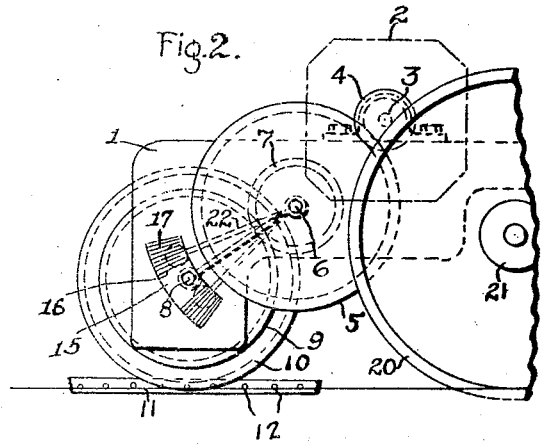

In the accompanying drawing constituting a part hereof and in which like reference characters designate like parts, Fig. 1 is a plan view of a rack-locomotive drive mechanism embodying the principles of this invention;

Fig. 2 is a diagrammatic view of the drive mechanism showing the association of the rack gear, motor and drive wheel.

Referring to Fig. 1, the device comprises a plurality of supporting frames 1 having a motor 2 centrally disposed therein and secured thereto in a suitable manner. The armature shaft 3 of the motor is journaled in the side frames 1 and is provided with drive pinions 4 on its respective ends which are in co-operative engagement with a pair of gears 5 secured to a shaft 6 having a pair of pinion members 7 mounted thereon. A main drive shaft 8 is journaled in the side members 1 and is provided with a pair of gear wheels 9 in co-operative alinement with the pinions 7 and having a rack gear 10 disposed therebetween and secured thereto, the rack gear 10 being adapted to engage a rack 11 provided with a plurality of teeth or cogs 12 which are centrally disposed between the side frames 1.

Referring to Fig. 2, the drive shaft 8 is journaled in a bearing block 15 which is movably mounted in an angular guide 16 and adapted to be fixed therein by a plurality of wedge-shaped liners 17. The journal block 15 is adapted to be moved angularly about the gear shaft 6 on a radius equal to the center distance between the shafts 6 and 8, respectively. This center distance is maintained at all times by a connecting link 22 and the adjustment is made by varying the number of liners 17 on the sides of the block 15 to adjust the height of the horizontal axis of the shaft with respect to the rack 11.

The drive mechanism is associated with a wheel 20 mounted on a supporting axle 21 on which the motor 2 may be rotatably supported, as is common in motor drives of the axle-hung type. The drive shaft 8 is adjustably secured to the shaft 6 by a spacer or connecting link 22 which is rotatably secured to the shafts 6 and 8 at its respective ends. The link 22 is angularly movable about the shaft 6, as indicated by the dotted lines, and may be fixed in its adjusted position in any suitable manner. The rack gear 10 may be adjusted to obtain the desired tooth engagement with the rack 11 by moving the link 22 to adjust the horizontal axis of the drive shaft 8 with respect to the shaft 6.

The adjustment of the rack gear is readily effected in a simple manner, as illustrated, for the purpose of making adjustment between the gear and rack to compensate for the wear of the wheel tire or the wear on the gear and rack elements themselves, thus making possible a longer service life of the wheel and gear parts.

Although I have illustrated and described a specific means for effecting such adjustment, it will be understood that this may be accomplished in various simple ways without departing from the principles herein set forth.

I claim as my invention:

1. In combination with a rack-locomotive drive mechanism, means for vertically adjusting the horizontal axis of the rack gear relative to the working surface of the rail, said means comprising an adjustable spacing link connected at its respective ends to the rack gear and to the drive-gear axles and adapted to be fixed in its operative positions.

2. In combination with a rack-locomotive drive mechanism, means for vertically adjusting the horizontal axis of the rack gear relative to the working surface of the rail, said means comprising a movable journal block secured in a guide and adapted to be fixed in its operative positions by a plurality of liners.

3. In combination with a rack-locomotive drive mechanism, means for vertically adjusting the horizontal axis of the rack gear relative to the working surface of the rail, said means comprising a movable journal block adapted to rotatably receive the rack-gear axle, said block being angularly movable in a guide and fixed therein by a plurality of liners.

4. In combination with a rack-locomotive drive mechanism, means for vertically adjusting the horizontal axis of the rack gear relative to the working surface of the rail, said means comprising a plurality of movable journal blocks adapted to rotatably receive the rack-gear axle, said blocks being angularly movable in guides and fixed therein by a plurality of liners.

In testimony whereof, I have hereunto subscribed my name this 27th day of September 1922.

HARALD A. KJELSBERG.